(12) United States Patent
Liu

(10) Patent No.: US 10,489,460 B2
(45) Date of Patent: Nov. 26, 2019

(54) METHOD AND APPARATUS FOR PROVIDING LOCAL SEARCH SUGGESTION

(71) Applicant: Baidu Online Network Technology (Beijing) Co., Ltd., Beijing (CN)

(72) Inventor: Junqi Liu, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 15/504,178

(22) PCT Filed: Nov. 18, 2015

(86) PCT No.: PCT/CN2015/094961
§ 371 (c)(1),
(2) Date: Feb. 15, 2017

(87) PCT Pub. No.: WO2016/201878
PCT Pub. Date: Dec. 22, 2016

(65) Prior Publication Data
US 2018/0089333 A1   Mar. 29, 2018

(30) Foreign Application Priority Data

Jun. 18, 2015   (CN) .......................... 2015 1 0342530

(51) Int. Cl.
  *G06F 7/00*   (2006.01)
  *G06F 17/30*   (2006.01)
  (Continued)

(52) U.S. Cl.
  CPC ...... *G06F 16/90328* (2019.01); *G06F 16/951* (2019.01); *G06F 16/957* (2019.01)

(58) Field of Classification Search
  CPC ......... G06F 17/30973; G06F 17/30899; G06F 17/30864; G06F 16/90328; G06F 16/957; G06F 16/951
  (Continued)

(56) References Cited

U.S. PATENT DOCUMENTS

2011/0072033 A1   3/2011   White
2012/0197857 A1   8/2012   Huang et al.
(Continued)

FOREIGN PATENT DOCUMENTS

CN   103577392 A   2/2014
CN   103577595 A   2/2014
(Continued)

OTHER PUBLICATIONS

International Search Report corresponding to International Patent Application No. PCT/CN2015/094961, State Intellectual Property Office of the P.R. China, dated Mar. 17, 2016; (3 pages).

*Primary Examiner* — Md I Uddin
(74) *Attorney, Agent, or Firm* — Justin D. Swindells

(57) ABSTRACT

A method for providing a local search suggestion. The method includes the steps as follows: acquiring, based on a current page presented in user equipment, page content information corresponding to page content currently browsed by a user; determining at least one local search suggestion matching the page content information; and presenting the at least one local search suggestion in the user equipment. According to the method of the present disclosure, at least one local search suggestion can be determined based on the page content currently browsed by the user, thus achieving a relatively high integrating degree between the local search suggestion and a user searching require-
(Continued)

ment, such that the user can quickly find a needed search suggestion, thereby shortening the time needed by the searching process.

11 Claims, 4 Drawing Sheets

(51) Int. Cl.
   *G06F 16/9032*   (2019.01)
   *G06F 16/951*    (2019.01)
   *G06F 16/957*    (2019.01)

(58) Field of Classification Search
   USPC .................. 707/706, 713, 767, 724, 748
   See application file for complete search history.

(56) References Cited

U.S. PATENT DOCUMENTS

| | | | |
|---|---|---|---|
| 2013/0226935 A1 | 8/2013 | Bai | |
| 2013/0282709 A1 | 10/2013 | Zhu | |
| 2014/0331142 A1 | 11/2014 | Li | |
| 2016/0360382 A1* | 12/2016 | Gross | G06F 3/0488 |

FOREIGN PATENT DOCUMENTS

| | | | |
|---|---|---|---|
| CN | 103577596 A | 2/2014 | |
| CN | 103577597 A | 2/2014 | |
| CN | 104021231 A | 9/2014 | |

* cited by examiner

METHOD AND APPARATUS FOR PROVIDING LOCAL SEARCH SUGGESTION

CROSS-REFERENCE TO RELATED APPLICATIONS

This application is a U.S. National Stage of International Application No. PCT/CN2015/094961, filed Nov. 18, 2015, which claims the benefit of Chinese Patent Application No. 201510342530.9, filed Jun. 18, 2015, both of which are incorporated herein by reference in their entireties.

TECHNICAL FIELD

The present disclosure relates to the field of computer technology, and in particular, to a method and an apparatus for providing a local search suggestion.

BACKGROUND

In the prior art, when a user enters a keyword in a search box, user equipment may generally present a network search suggestion list acquired from a service equipment terminal based on the keyword, such that the user can select a required network search suggestion from the network search suggestion list, thereby initiating a search.

SUMMARY

An objective of the present disclosure is to provide a method and an apparatus for providing a local search suggestion.

According to an aspect of the present disclosure, a method for providing a local search suggestion is provided, comprising:

acquiring, according to a current page presented in user equipment, page content information corresponding to page content currently browsed by a user;

determining at least one local search suggestion matching the page content information; and presenting the at least one local search suggestion in the user equipment.

According to another aspect of the present disclosure, an apparatus for providing a local search suggestion is further provided, comprising:

a first acquisition module configured to acquire, based on a current page presented in user equipment, page content information corresponding to page content currently browsed by a user;

a determination module configured to determine at least one local search suggestion matching the page content information; and a presentation module configured to present the at least one local search suggestion in the user equipment.

Compared with the prior art, the present disclosure has the following advantages: 1) in consideration that a user's search requirement is generally related to the page content currently browsed by the user, at least one local search suggestion matching the page content may be determined based on the page content currently browsed by the user (instead of depending on a keyword), thus achieving a relatively high integration between the local search suggestion and the user's search requirement, such that the user can quickly find a search suggestion she needs, thereby shortening the time required by the searching process; 2) when the user browses a non-search result page, at least one local search suggestion can be acquired without the need to jump to a page where the search box is located and manually input a keyword in the search box, thereby simplifying the procedure of acquiring the search suggestion, and further shortening the time required by the searching process; 3) the user may trigger, through multiple predetermined operations, the user equipment to acquire the page content information corresponding to the page content currently browsed by the user, and the triggering scheme is applicable to different scenarios and different types of devices, has a broad range of application, and facilitates the user's rapid acquisition of the local search suggestion by using a suitable triggering method; 4) a search can be quickly initiated based on a local search suggestion selected by the user from at least one local search suggestion determined by the user equipment, to acquire a search result; 5) at least one network search suggestion matching the local search suggestion can be acquired based on the local search suggestion selected by the user, such that a search is initiated based on a network search suggestion repeatedly selected by the user from the at least one network search suggestion, to acquire a search result, where the process of the repeated selection can extend or revise the local search suggestion selected by the user, such that the network search suggestion selected by the user is more accurate and better suits the user requirement, thereby avoiding the limitation of only considering the page content currently browsed by the user, and also avoiding an inaccurate search result caused by the incompleteness of the determined local search suggestion.

BRIEF DESCRIPTION OF THE DRAWINGS

Other features, objectives and advantages of the present disclosure will become more apparent upon reading the detailed description to non-limiting embodiments with reference to the accompanying drawings, wherein.

Identical or similar reference numerals in the accompanying drawings represent identical or similar components.

DETAILED DESCRIPTION OF EMBODIMENTS

The present disclosure is further described in detail with reference to the accompanying drawings.

Figure 1:
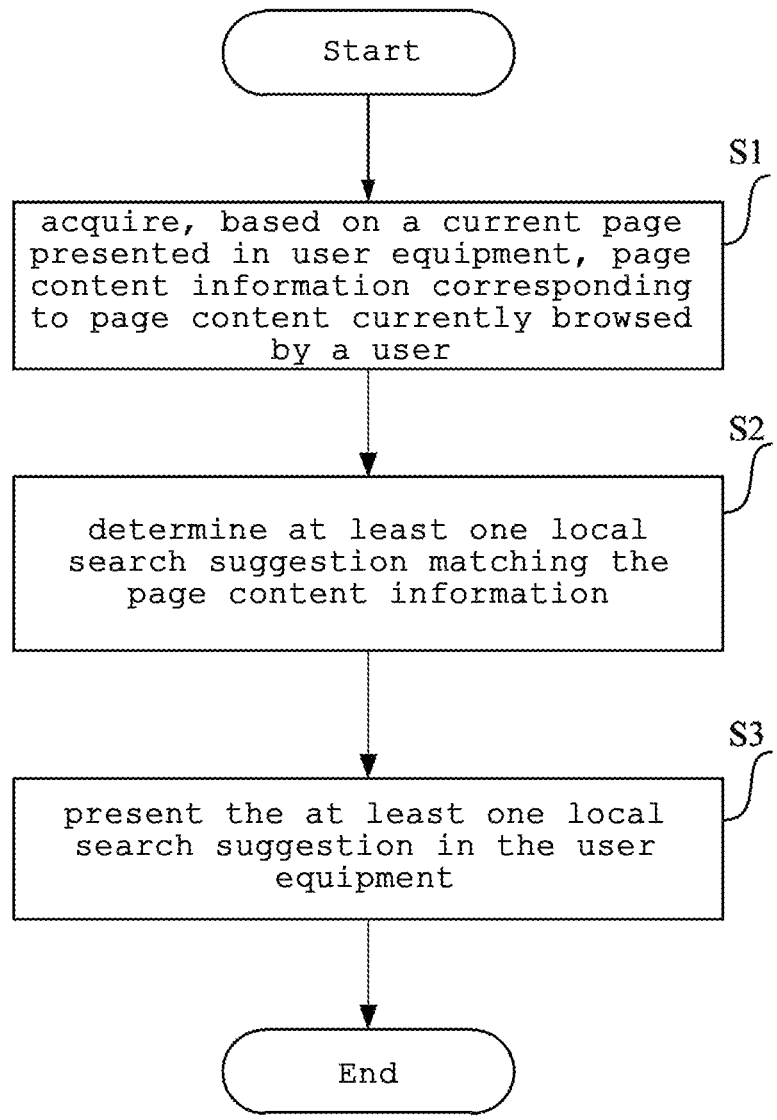
FIG. 1 is a schematic flowchart of a method for providing a local search suggestion according to an embodiment of the present disclosure.

FIG. 1 is a schematic flowchart of a method for providing a local search suggestion according to an embodiment of the present disclosure.

The method of this embodiment is generally implemented by user equipment; and the user equipment includes, but is not limited to, a PC, a tablet computer, a smart phone, a PDA, an IPTV.

It should be noted that, the user equipment is merely an example, other user equipment that currently exists or may appear in the future is applicable to the present disclosure, and shall fall within the protection scope of the present disclosure, which may be incorporated herein by reference.

The method according to this embodiment includes step S1, step S2, and step S3.

At step S1, a computer device acquires, based on a current page presented in user equipment, page content information corresponding to page content currently browsed by a user.

The current page is used to denote a page currently loaded in the user equipment. Preferably, the current page is a non-search result page, that is, the current page is not a page acquired by searching.

The page content currently browsed by the user is used to denote content currently presented on a screen of the user equipment, and the page content may be the entire content or partial content of the current page. The page content information includes any information related to the page content currently browsed by the user. Preferably, the page content information includes, but is not limited to: text information included in the page content, multimedia information related to multimedia (such as a picture, a video, and an audio) included in the page content (for example, the multimedia information is information for describing the multimedia, and a name corresponding to the multimedia).

Specifically, an implementation of the acquiring, by a computer device based on a current page presented in user equipment, page content information corresponding to page content currently browsed by a user includes, but is not limited to:

1) When it is determined that the page content currently browsed by the user is partial content of the current page, the user equipment acquires location information of the partial content in the current page. The user equipment then acquires, based on the current page and the location information, the page content information corresponding to the page content currently browsed by the user.

The user equipment may determine, by using multiple methods, that the page content currently browsed by the user is partial content of the current page. For example, if the user equipment determines, based on scaling of the current page, that the current page is in a zoom-in state, and determines, with reference to the size of the current page, that the size of the zoomed-in current page is greater than the size of the screen of the user equipment, the user equipment determines that the page content currently browsed by the user is partial content of the current page. For another example, the user equipment captures a picture on the screen of the user equipment, and analyzes the picture. The user equipment then compares the analysis result of the picture with an analysis result of the current page, to determine that the page content browsed by the user is partial content of the current page.

The location information includes any information for indicating a location of the page content currently browsed by the user in the current page, for example, information for indicating an area location of the page content in the current page, information for indicating a shift of the page content relative to initial display content of the current page.

Specifically, when it is determined that the page content currently browsed by the user is partial content of the current page, the user equipment acquires location information of the partial content in the current page. The user equipment then analyzes the current page based on the location information, and acquires page content information corresponding to the partial content.

For example, when it is determined that the page content currently browsed by the user is partial content of the current page, the user equipment acquires location information of the partial content in the current page, the location information indicating that the partial content is located in an upper left area in the current page. The user equipment then analyzes the current page, and acquires the page content information of the upper left area in the current page.

2) When it is determined that the page content currently browsed by the user is the entire content of the current page, the user equipment directly analyzes the current page, and acquires the page content information corresponding to the page content currently browsed by the user.

The user equipment may determine, by using multiple methods, that the page content currently browsed by the user is the entire content of the current page. For example, the user equipment determines, based on scaling of the current page, that the current page is in a normal state (i.e., not zoomed in or out), and determines, with reference to the size of the current page and the size of the screen of the user equipment, that the page content currently browsed by the user is the entire content of the current page. For another example, the user equipment captures a picture on the screen of the user equipment, and analyzes the picture. The user equipment then compares the analysis result of the picture with an analysis result of the current page, to determine that the page content browsed by the user is the entire content of the current page.

Specifically, when it is determined that the page content currently browsed by the user is the entire content of the current page, the user equipment directly analyzes the current page, and acquires the page content information corresponding to the entire content of the current page.

As a preferred solution of step S1, step S1 further includes the following step: acquiring, by the user equipment based on the current page presented in the user equipment, the page content information corresponding to the page content currently browsed by the user, when it is detected that the user executes a predetermined operation.

The predetermined operation includes any predetermined operation for instructing the user equipment to acquire the page content information corresponding to the page content currently browsed by the user. Preferably, the predetermined operation includes, but is not limited to:

1) an operation of clicking a predetermined button on the current page.

The predetermined button is a pre-existing button in the current page. When the user clicks the predetermined button, it indicates that the user instructs the user equipment to acquire the page content information corresponding to the page content currently browsed by the user.

2) a predetermined gesture operation.

The predetermined gesture operation includes any predetermined gesture operation capable of triggering the user equipment to acquire the page content information corresponding to the page content currently browsed by the user. Preferably, the predetermined gesture operation is predefined in the user equipment or the current page. It should be noted that, preferably, when the user browses the current page, the user equipment may present prompt information for prompting the user with the predetermined gesture operation, such that the user can perform a correct gesture operation.

3) an operation of enabling the user equipment to move based on a predetermined movement track.

The user equipment may determine a movement track of the user equipment by using a sensor in the user equipment. When the movement track of the user equipment matches the predetermined movement track, the user equipment may determine that the user performs an operation of enabling the user equipment to move based on the predetermined movement track.

The predetermined movement track is predefined in the user equipment or the current page. It should be noted that, preferably, when the user browses the current page, the user equipment may present prompt information for prompting the user with the predetermined movement track, such that the user can move the user equipment based on the predetermined movement track.

It should be noted that, the above-mentioned predetermined operation is merely exemplary, and persons skilled in the art can understand that any predetermined operation for instructing the user equipment to acquire the page content information corresponding to the page content currently browsed by the user should be included in the scope of the predetermined operation based on the present disclosure.

It should be noted that, the above-mentioned preferred solution may be combined with the implementations 1) and 2) of step S1. For example, when it is detected that the user performs the predetermined operation and it is determined that the page content currently browsed by the user is partial content of the current page, the user equipment acquires location information of the partial content in the current page. The user equipment then acquires, based on the current page and the location information, the page content information corresponding to the page content currently browsed by the user. For another example, when it is detected that the user performs the predetermined operation and it is determined that the page content currently browsed by the user is the entire content of the current page, the current page is analyzed directly, to acquire the page content information corresponding to the page content currently browsed by the user.

It should be noted that, the above-mentioned examples are merely used for better illustrating the technical solutions of the present disclosure, rather than limiting the present disclosure. Persons skilled in the art should understand that any implementation of acquiring, based on a current page presented in user equipment, the page content information corresponding to the page content currently browsed by a user should be included in the scope of the present disclosure.

At step S2, the user equipment determines at least one local search suggestion matching the page content information.

The local search suggestion is used to denote a search suggestion generated locally by the user equipment.

For example, the page content information includes text information included in the page content, and the user equipment segments the text information into words to acquire at least one keyword in the page content, and determines, based on the at least one keyword, at least one local search suggestion matching the page content information. It should be noted that, in this example, a local search suggestion may be an acquired keyword, or a sequence obtained by combining multiple keywords.

For another example, the page content information includes multimedia information related to multimedia included in the page content, and the user equipment acquires, based on the multimedia information, at least one local search suggestion matching the multimedia. For example, the user equipment determines, based on the multimedia information, that a picture included in the page content currently browsed by the user is a landscape picture of Mount Tai, and then the user equipment acquires the following local search suggestions: Mount Tai and Mount Tai travel guides, matching the picture.

It should be noted that, the above-mentioned examples are merely used for better illustrating the technical solutions of the present disclosure, rather than limiting the present disclosure. Persons skilled in the art should understand that any implementation of determining at least one local search suggestion matching the page content information should be included in the scope of the present disclosure.

At step S3, the user equipment presents the at least one local search suggestion in the user equipment.

The user equipment may present the determined at least one local search suggestion in the user equipment by using multiple methods.

For example, the user equipment directly presents the at least one local search suggestion in the current page, e.g., the user equipment presents the at least one local search suggestion in a bottom area or a right area in the page currently browsed by the user.

For another example, the user equipment provides a popup message box at a layer above the current page, to present the at least one local search suggestion.

The at least one local search suggestion may be presented in multiple forms, such as a list form, and a tile form.

It should be noted that, the above-mentioned examples are merely used for better illustrating the technical solutions of the present disclosure, rather than limiting the present disclosure. Persons skilled in the art should understand that any implementation of presenting at least one local search suggestion in the user equipment should be included in the scope of the present disclosure.

In the prior art, when a user enters a keyword in a search box, the user equipment may generally present a network search suggestion list acquired from a service equipment end based on the keyword, such that the user can select a required network search suggestion from the network search suggestion list, thereby initiating a search.

It is found in the present disclosure that the prior art has the following problems: 1) a user equipment terminal can only acquire a network search suggestion list from a service equipment terminal, and the network search suggestion list merely depends on a keyword, without considering the user who carries out the search. For example, the network search suggestion list is generally determined by the service equipment terminal (such as a cloud end) on the basis of whole-network data analysis and with reference to the popularity of a current keyword. Moreover, in a given time period, if the keyword and the searching type remain the same, the network search suggestion list acquired for the keyword is unchanged. 2) In the prior art, the user needs to manually input a keyword in a search box to acquire a network search suggestion list corresponding to the keyword, and the user generally needs to actively select a searching type before searching, which makes a search initiating process relatively complex, and the manual inputting operation greatly reduces the searching speed. 3) Content that the user needs to search for is generally related to content currently browsed. However, the correlation between a search suggestion and the content currently browsed by the user is not taken into consideration in the prior art.

According to the solution of this embodiment, considering that a search requirement of a user is generally related to the page content currently browsed by the user, at least one local search suggestion matching the page content may be determined based on the page content currently browsed by the user (instead of depending on a keyword), thus achieving a relatively high integrating degree between the local search suggestion and the user's search requirement, such that the user can quickly find a needed search suggestion, thereby shortening the time required by the searching process. In addition, when the user browses a non-search result page, at least one local search suggestion can be acquired without the need to jump to a page where the search box is located or manually input a keyword in the search box, thereby simplifying the procedure of acquiring the search suggestion, and further shortening the time required by the searching process. Moreover, the user can trigger, through multiple predetermined operations, the user equipment to acquire the page content information corresponding to the page content currently browsed by the user, and the triggering scheme is applicable to different scenarios and devices of different types, has an extremely broad range of application, and facilitates the user to quickly acquire the local search suggestion by using a suitable triggering method.

Figure 2:
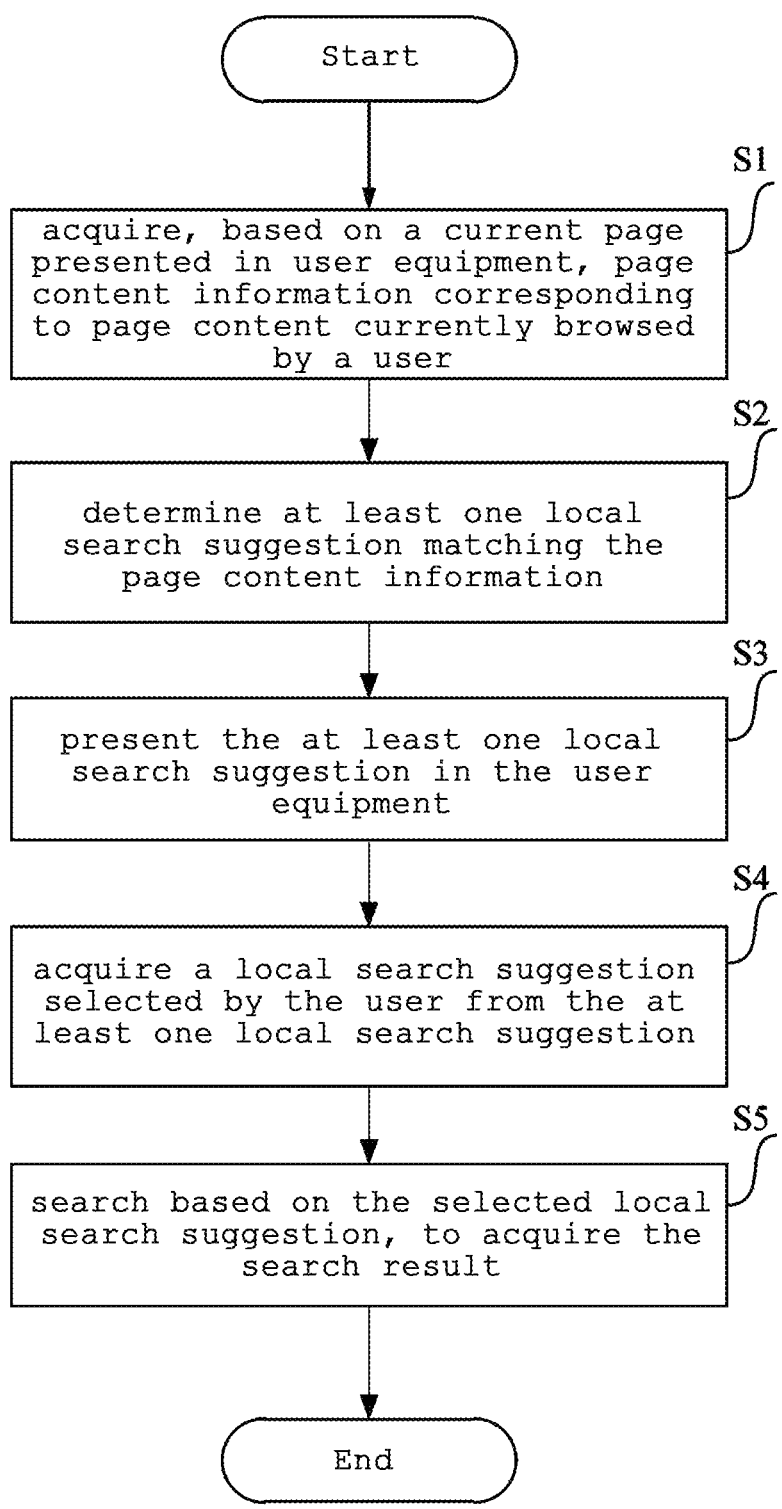
FIG. 2 is a schematic flowchart of a method for providing a local search suggestion according to another embodiment of the present disclosure.

FIG. 2 is a schematic flowchart of a method for providing a local search suggestion according to another embodiment of the present disclosure. The method of this embodiment is generally implemented by user equipment; any illustration made on the user equipment with reference to FIG. 1 is incorporated herein by reference.

The method according to this embodiment includes step S1, step S2, step S3, step S4 and step S5. Step S1, step S2 and step S3 have been described in detail with reference to FIG. 1, and will not be repeated herein.

At step S4, the user equipment acquires a local search suggestion selected by the user from the at least one local search suggestion.

Specifically, the user equipment acquires, based on a user operation, a local search suggestion selected by the user from the at least one local search suggestion.

For example, at step S3, the user equipment presents the determined at least one local search suggestion to the user. At step S4, the user equipment acquires, based on a selection operation by the user in the at least one local search suggestion, a local search suggestion selected by the user.

It should be noted that, the above-mentioned examples are merely used for better illustrating the technical solutions of the present disclosure, rather than limiting the present disclosure. Persons skilled in the art should understand that any implementation of acquiring a local search suggestion selected by the user from the at least one local search suggestion should be included in the scope of the present disclosure.

At step S5, the user equipment searches based on the local search suggestion selected by the user, to acquire the search result.

Specifically, the implementation of the searching by the user equipment based on the local search suggestion selected by the user, to acquire the search result includes, but is not limited to:

1) The user equipment directly initiates a search for the local search suggestion selected by the user, and acquires the search result corresponding to the local search suggestion.

For example, at step S4, the user equipment acquires a local search suggestion "Mount Tai" selected by the user from the at least one local search suggestion. At step S5, the user equipment directly initiates a search for "Mount Tai," to acquire the search result corresponding to "Mount Tai."

2) The user equipment acquires at least one network search suggestion from the service equipment based on the local search suggestion selected by the user, and presents the at least one network search suggestion to the user. The user equipment then acquires a network search suggestion selected by the user from the at least one network search suggestion. The user equipment then searches based on the selected network search suggestion, to acquire the search result.

The network search suggestion is used to denote a search suggestion determined by the service equipment terminal based on the local search suggestion selected by the user, and provided to the user equipment.

For example, the user equipment submits, to the search box, a local search suggestion "iPhone" selected by the user, acquires from the service equipment the following 3 network search suggestions: iPhone, iPhone official website, and iPhone6 plus, and presents the 3 network search suggestions in a display area under the search box. The user equipment then acquires, based on a user operation, "iPhone6 plus" selected by the user from the 3 network search suggestions. The user equipment then initiates a search for "iPhone6 plus," and acquires the search result corresponding to "iPhone6 plus." In this example, the user revises the selected local search suggestion by selecting the network search suggestion.

For another example, the user equipment submits, to the search box, a local search suggestion "Mount Tai" selected by the user, acquires from the service equipment the following 3 network search suggestions: Mount Tai travel guides, Mount Tai tickets, and Mount Tai weather, and presents the 3 network search suggestions in a display area under the search box. The user equipment then acquires, based on a user operation, "Mount Tai travel guides" selected by the user from the 3 network search suggestions. The user equipment then initiates a search for "Mount Tai travel guides," and acquires the search result corresponding to "Mount Tai travel guides." In this example, the user extends the selected local search suggestion by selecting the network search suggestion.

It should be noted that, the above-mentioned examples are merely used for better illustrating the technical solutions of the present disclosure, rather than limiting the present disclosure. Persons skilled in the art should understand that any implementation of searching based on the local search suggestion selected by the user to acquire the search result should be included in the scope of the present disclosure.

According to the solution of this embodiment, a search can be quickly initiated based on a local search suggestion selected by a user from at least one local search suggestion determined by user equipment, to acquire a search result. Moreover, based on the local search suggestion selected by the user, at least one network search suggestion matching the local search suggestion can be acquired, such that a search is initiated based on a network search suggestion reselected by the user from the at least one network search suggestion, to acquire a search result. The reselection process can extend or revise the local search suggestion selected by the user, such that the network search suggestion selected by the user is more accurate and better meets the user requirement, thereby avoiding the limit of considering only the page content currently browsed by the user, and also avoiding an inaccurate search result caused by the incompletion of the determined local search suggestion.

Figure 3:
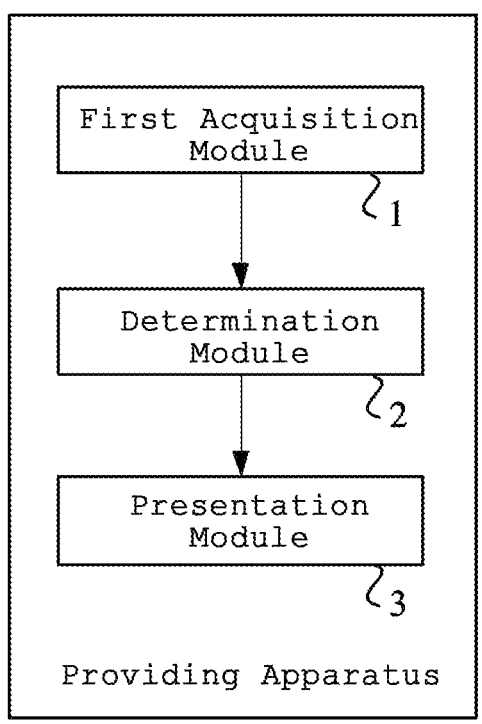
FIG. 3 is a schematic structural diagram of an apparatus for providing a local search suggestion according to an embodiment of the present disclosure.

FIG. 3 is a schematic structural diagram of an apparatus for providing a local search suggestion according to an embodiment of the present disclosure.

The apparatus for providing a local search suggestion (briefly referred to as a "providing apparatus" in the following) according to this embodiment includes a first acquisition module 1, a determination module 2, and a presentation module 3.

The first acquisition module 1 acquires, based on a current page presented in user equipment, page content information corresponding to page content currently browsed by a user.

The current page is used to denote a page currently loaded in the user equipment. Preferably, the current page is a non-search result page, that is, the current page is not a page acquired by searching.

The page content currently browsed by the user is used to denote content currently presented on a screen of the user equipment, and the page content may be the entire content or partial content of the current page. The page content information includes any information related to the page content currently browsed by the user. Preferably, the page content information includes, but is not limited to: text information included in the page content, multimedia information related to a multimedia (such as a picture, a video, and an audio) included in the page content (for example, the multimedia information is information for describing the multimedia, and a name corresponding to the multimedia).

Specifically, an implementation of the acquiring, by the first acquisition module 1 based on a current page presented in user equipment, page content information corresponding to page content currently browsed by a user includes, but is not limited to:

1) The first acquisition module 1 further includes a second acquisition sub-module (not shown) and a third acquisition sub-module (not shown). When it is determined that the page content currently browsed by the user is partial content of the current page, the second acquisition sub-module acquires location information of the partial content in the current page. The third acquisition sub-module then acquires, based on the current page and the location information, the page content information corresponding to the page content currently browsed by the user.

The second acquisition sub-module may determine, by using multiple methods, that the page content currently browsed by the user is partial content of the current page. For example, if the second acquisition sub-module determines, based on the scaling of the current page, that the current page is in a zoom-in state, and determines, with reference to the size of the current page, that the size of the zoomed-in current page is greater than the size of the screen of the user equipment, the second acquisition sub-module determines that the page content currently browsed by the user is partial content of the current page. For another example, the second acquisition sub-module captures a picture on the screen of the user equipment, and analyzes the picture. The second acquisition sub-module then compares the analysis result of the picture with an analysis result of the current page, to determine that the page content browsed by the user is partial content of the current page.

The location information includes any information for indicating a location of the page content currently browsed by the user in the current page, for example, information for indicating an area location of the page content in the current page, information for indicating a shift of the page content relative to initial display content of the current page.

Specifically, when it is determined that the page content currently browsed by the user is partial content of the current page, the second acquisition sub-module acquires location information of the partial content in the current page. The third acquisition sub-module then analyzes the current page based on the location information, and acquires page content information corresponding to the partial content.

For example, when it is determined that the page content currently browsed by the user is partial content of the current page, the second acquisition sub-module acquires location information of the partial content in the current page, the location information indicating that the partial content is located in an upper left area in the current page. The third acquisition sub-module then analyzes the current page, and acquires the page content information of the upper left area in the current page.

2) The first acquisition module 1 further includes a fourth acquisition sub-module (not shown). The fourth acquisition sub-module directly analyzes the current page when it is determined that the page content currently browsed by the user is the entire content of the current page, and acquires the page content information corresponding to the page content currently browsed by the user.

The fourth acquisition sub-module may determine, by using multiple methods, that the page content currently browsed by the user is the entire content of the current page. For example, the fourth acquisition sub-apparatus determines, based on the scaling of the current page, that the current page is in a normal state (i.e., not zoomed in or out), and determines, with reference to the size of the current page and the size of the screen of the user equipment, that the page content currently browsed by the user is the entire content of the current page. For another example, the fourth acquisition sub-module captures a picture on the screen of the user equipment, and analyzes the picture. The fourth acquisition sub-module then compares the analysis result of the picture with an analysis result of the current page, to determine that the page content browsed by the user is the entire content of the current page.

Specifically, when it is determined that the page content currently browsed by the user is the entire content of the current page, the fourth acquisition sub-module directly analyzes the current page, and acquires the page content information corresponding to the entire content of the current page.

As a preferred solution of the first acquisition module 1, the first acquisition module 1 further includes a first acquisition sub-module (not shown). The first acquisition sub-module acquires, based on the current page presented in the user equipment, the page content information corresponding to the page content currently browsed by the user, when it is detected that the user executes a predetermined operation.

The predetermined operation includes any predetermined operation for instructing the user equipment to acquire the page content information corresponding to the page content currently browsed by the user. Preferably, the predetermined operation includes, but is not limited to:

1) an operation of clicking a predetermined button on the current page.

The predetermined button is a button existing in the current page in advance, and when the user clicks the predetermined button, it indicates that the user instructs the user equipment to acquire the page content information corresponding to the page content currently browsed by the user.

2) a predetermined gesture operation.

The predetermined gesture operation includes any predetermined gesture operation capable of triggering the user equipment to acquire the page content information corresponding to the page content currently browsed by the user. Preferably, the predetermined gesture operation is predefined in the user equipment or the current page. It should be noted that, preferably, when the user browses the current page, the user equipment may present prompt information for prompting the user with the predetermined gesture operation, such that the user can perform a correct gesture operation.

3) an operation of enabling the user equipment to move based on a predetermined movement track.

The user equipment may determine a movement track of the user equipment by using a sensor in the user equipment. When the movement track of the user equipment matches the predetermined movement track, the user equipment may determine that the user performs an operation of enabling the user equipment to move based on the predetermined movement track.

The predetermined movement track is predefined in the user equipment or the current page. It should be noted that, preferably, when the user browses the current page, the user equipment may present prompt information for prompting the user with the predetermined movement track, such that the user can move the user equipment based on the predetermined movement track.

It should be noted that, the above-mentioned predetermined operation is merely exemplary, and persons skilled in the art can understand that any predetermined operation for instructing the user equipment to acquire the page content information corresponding to the page content currently browsed by the user should be included in the scope of the predetermined operation according to the present disclosure.

It should be noted that, the above-mentioned preferred solution may be combined with the implementations 1) and 2) of the first acquisition sub-module 1. For example, when it is detected that the user performs the predetermined operation and it is determined that the page content currently browsed by the user is partial content of the current page, the first acquisition sub-module 1 acquires location information of the partial content in the current page. The first acquisition sub-module 1 then acquires, based on the current page and the location information, the page content information corresponding to the page content currently browsed by the user. For another example, when it is detected that the user performs the predetermined operation and it is determined that the page content currently browsed by the user is the entire content of the current page, the first acquisition sub-module 1 directly analyzes the current page, to acquire the page content information corresponding to the page content currently browsed by the user.

It should be noted that, the above-mentioned examples are merely used for better illustrating the technical solutions of the present disclosure, rather than limiting the present disclosure. Persons skilled in the art should understand that any implementation of acquiring, based on a current page presented in user equipment, page content information corresponding to a page content currently browsed by a user should be included in the scope of the present disclosure.

The determination module 2 determines at least one local search suggestion matching the page content information.

The local search suggestion is used to denote a search suggestion generated locally by the user equipment.

For example, the page content information includes text information included in the page content, and the determination module 2 segments the text information into words to acquire at least one keyword in the page content, and determines, based on the at least one keyword, at least one local search suggestion matching the page content information. It should be noted that, in this example, a local search suggestion may be an acquired keyword, or a sequence obtained by combining multiple keywords.

For another example, the page content information includes multimedia information related to multimedia included in the page content, and the determination module 2 acquires the following multimedia information, at least one local search suggestion matching the multimedia. For example, the determination module 2 determines, based on the multimedia information, that a picture included in the page content currently browsed by the user is a landscape picture of Mount Tai, and then the determination module 2 acquires the following local search suggestions: Mount Tai and Mount Tai travel guides, matching the picture.

It should be noted that, the above-mentioned examples are merely used for better illustrating the technical solutions of the present disclosure, rather than limiting the present disclosure. Persons skilled in the art should understand that any implementation of determining at least one local search suggestion matching the page content information should be included in the scope of the present disclosure.

The presentation module 3 presents the determined at least one local search suggestion in the user equipment.

The presentation module 3 may present the determined at least one local search suggestion in the user equipment by using multiple methods.

For example, the presentation module 3 directly presents the at least one local search suggestion in the current page, e.g., the presentation module 3 presents the at least one local search suggestion in a bottom area or a right area in the page currently browsed by the user.

For another example, the presentation module 3 provides a popup message box at a layer above the current page, to present the at least one local search suggestion.

The at least one local search suggestion may be presented in multiple forms, such as a list form, and a tile form.

It should be noted that, the above-mentioned examples are merely used for better illustrating the technical solutions of the present disclosure, rather than limiting the present disclosure. Persons skilled in the art should understand that any implementation of presenting at least one local search suggestion in the user equipment should be included in the scope of the present disclosure.

In the prior art, when a user enters a keyword in a search box, the user equipment may generally present a network search suggestion list acquired from a service equipment terminal based on the keyword, such that the user can select a required network search suggestion from the network search suggestion list, thereby initiating a search.

It is found in the present disclosure that the prior art has the following problems: 1) a user equipment terminal can only acquire a network search suggestion list from a service equipment terminal, and the network search suggestion list merely depends on a keyword, without considering the user who carries out the search. For example, the network search suggestion list is generally determined by the service equipment terminal (such as a cloud end) on the basis of whole-network data analysis and with reference to the popularity of a current keyword. Moreover, in a period of time, if the keyword and the searching type keep unchanged, the network search suggestion list acquired for the keyword is unchanged. 2) In the prior art, the user needs to manually input a keyword in a search box to acquire a network search suggestion list corresponding to the keyword, and the user generally needs to actively select a searching type before searching, which makes a search initiating process relatively complex, and the manual inputting operation greatly reduces the searching speed. 3) Content that the user needs to search for is generally related to content currently browsed. However, the correlation between a search suggestion and the content currently browsed by the user is not taken into consideration in the prior art.

According to the solution of this embodiment, considering that a search requirement of a user is generally related to the page content currently browsed by the user, at least one local search suggestion matching the page content may be determined based on the page content currently browsed by the user (instead of depending on a keyword), thus achieving a relatively high integrating degree between the local search suggestion and the user's search requirement, such that the user can quickly find a needed search suggestion, thereby shortening the time required by the searching process. In addition, when the user browses a non-search result page, at least one local search suggestion can be acquired without the need to jump to a page where the search box is located or manually input a keyword in the search box, thereby simplifying the procedure of acquiring the search suggestion, and further shortening the time required by the searching process. Moreover, the user can trigger, through multiple predetermined operations, the user equipment to acquire the page content information corresponding to the page content currently browsed by the user, and the triggering scheme is applicable to different scenarios and devices of different types, has an extremely broad range of application, and facilitates the user to quickly acquire the local search suggestion by using a suitable triggering method.

Figure 4:
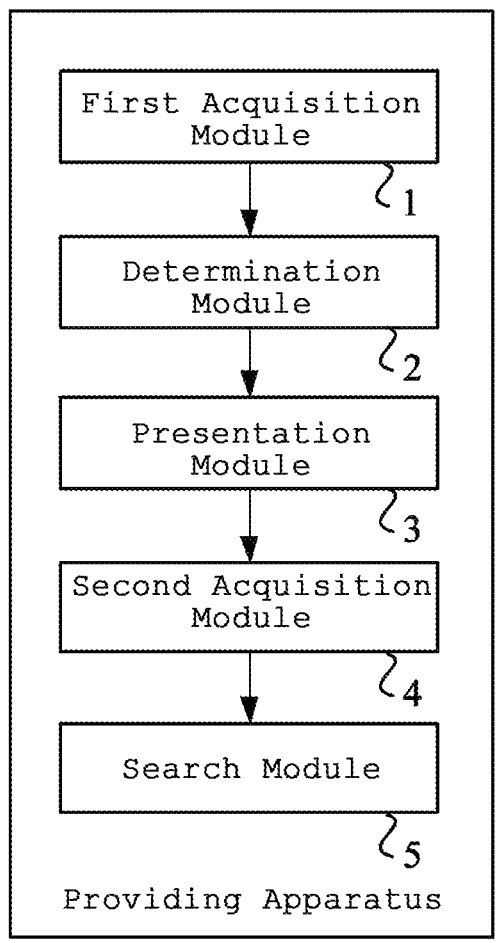
FIG. 4 is a schematic structural diagram of an apparatus for providing a local search suggestion according to another embodiment of the present disclosure.

FIG. 4 is a schematic structural diagram of an apparatus for providing a local search suggestion according to another embodiment of the present disclosure.

The providing apparatus according to this embodiment includes a first acquisition module 1, a determination module 2, a presentation module 3, a second acquisition module 4, and a search module 5. The first acquisition module 1, determination module 2, and presentation module 3 have been described in detail with reference to FIG. 3, and will not be repeated herein.

The second acquisition module 4 acquires a local search suggestion selected by the user from the at least one local search suggestion.

Specifically, the second acquisition module 4 acquires, based on a user operation, a local search suggestion selected by the user from the at least one local search suggestion.

For example, the presentation module 3 presents the determined at least one local search suggestion to the user. The second acquisition module 4 acquires, based on a selection operation by the user in the at least one local search suggestion, a local search suggestion selected by the user.

It should be noted that, the above-mentioned examples are merely used for better illustrating the technical solutions of the present disclosure, rather than limiting the present disclosure. Persons skilled in the art should understand that any implementation of acquiring a local search suggestion selected by the user from the at least one local search suggestion should be included in the scope of the present disclosure.

The search module 5 searches based on the local search suggestion selected by the user, to acquire the search result.

Specifically, the implementation of searching by the search module 5 based on the local search suggestion selected by the user, to acquire the search result includes, but is not limited to:

1) The search module 5 directly initiates a search for the local search suggestion selected by the user, and acquires the search result corresponding to the local search suggestion.

For example, the second acquisition module 4 acquires a local search suggestion "Mount Tai" selected by the user from the at least one local search suggestion. The search module 5 directly initiates a search for "Mount Tai," to acquire the search result corresponding to "Mount Tai."

2) The search module 5 further includes a third acquisition module (not shown), a fourth acquisition module (not shown), and a search sub-module (not shown). The third acquisition module acquires at least one network search suggestion from the service equipment based on the local search suggestion selected by the user, and presents the at least one network search suggestion to the user. The fourth acquisition module then acquires a network search suggestion selected by the user from the at least one network search suggestion. The search sub-module then searches based on the selected network search suggestion, to acquire the search result.

The network search suggestion is used to denote a search suggestion determined by the service equipment terminal based on the local search suggestion selected by the user, and provided to the user equipment.

For example, the third acquisition module submits, to the search box, a local search suggestion "iPhon" selected by the user, acquires from the service equipment the following 3 network search suggestions: iPhone, iPhone official website, and iPhone6 plus, and presents the 3 network search suggestions in a display area under the search box. The fourth acquisition module then acquires, based on a user operation, "iPhone6 plus" selected by the user from the 3 network search suggestions. The search sub-module then initiates a search for "iPhone6 plus," and acquires the search result corresponding to "iPhone6 plus." In this example, the user revises the selected local search suggestion by selecting the network search suggestion.

For another example, the third acquisition module submits, to the search box, a local search suggestion "Mount Tai" selected by the user, acquires from the service equipment the following 3 network search suggestions: Mount Tai travel guides, Mount Tai ticket, and Mount Tai weather, and presents the 3 network search suggestions in a display area under the search box. The fourth acquisition module then acquires, based on a user operation, "Mount Tai travel guides" selected by the user from the 3 network search suggestions. The search sub-module then initiates a search for "Mount Tai travel guides," and acquires the search result corresponding to "Mount Tai travel guides." In this example, the user extends the selected local search suggestion by selecting the network search suggestion.

It should be noted that, the above-mentioned examples are merely used for better illustrating the technical solutions of the present disclosure, rather than limiting the present disclosure. Persons skilled in the art should understand that any implementation of searching based on the local search suggestion selected by the user to acquire the search result should be included in the scope of the present disclosure.

According to the solution of this embodiment, a search can be quickly initiated based on a local search suggestion selected by a user from at least one local search suggestion determined by user equipment, to acquire a search result. Moreover, based on the local search suggestion selected by the user, at least one network search suggestion matching the local search suggestion can be acquired, such that a search is initiated based on a network search suggestion reselected by the user from the at least one network search suggestion, to acquire a search result. The reselection process can extend or revise the local search suggestion selected by the user, such that the network search suggestion selected by the user is more accurate and better meets the user requirement, thereby avoiding the limit of considering only the page content currently browsed by the user, and also avoiding an inaccurate search result caused by the incompletion of the determined local search suggestion.

It should be noted that the present disclosure may be implemented in software and/or a combination of software and hardware. For example, various apparatus according to the present disclosure may be implemented by an application-specific integrated circuit (ASIC) or any other similar hardware devices. In one embodiment, a software program of the present disclosure may be executed by a processor to implement the above-mentioned steps or functions. Likewise, the software program of the present disclosure (including a relevant data structure) may be stored in a computer-readable recording medium, for example, a RAM memory, a magnetic or optical driver, a floppy disk, or a similar device. Additionally, some steps or functions of the present disclosure may be implemented using hardware, for example, as a circuit cooperating with the processor to perform the functions or steps.

To those skilled in the art, it is apparent that the present disclosure is not limited to the details of the above-mentioned exemplary embodiments, and the present disclosure may be implemented in other specific forms without departing from the spirit or basic features of the present disclosure. Thus, from whichever perspective, the embodiments should be regarded as exemplary, not limitative. The scope of the present disclosure is limited by the appended claims, rather than the above-mentioned depiction. Thus, all variations intended to fall into the meaning and scope of equivalent elements of the claims should be covered within the present disclosure. No reference signs in the claims should be regarded as limiting the involved claims. Besides, it is apparent that the term "comprise" does not exclude other units or steps, and singularity does not exclude plurality. A plurality of units or means stated in a system claim may also be implemented by a single unit or means through software or hardware. Terms such as "first" and "second" are used to indicate names, but do not indicate any particular sequence.

What is claimed is:

1. A method for providing a local search suggestion, comprising:
   acquiring, based on a current page presented in a user equipment, page content information corresponding to page content currently browsed by a user, in response to detecting the user equipment moving along a moving track matching a predetermined movement track, the acquiring, based on a current page presented in a user equipment page content information corresponding to page content currently browsed by a user comprising:
   acquiring a partial area of the current page when it is determined based on a scaling of the current page that the current page is in a zoomed-in state with reference to a determined size of the current page and that the determined size of the zoomed-in current page is greater than a size of a screen of the user equipment, the user equipment determining that the page content currently browsed on the user equipment is partial content of the current page, the page content information being located within the partial area, and the size of the current page being capable of being enlarged to a size larger than the size of the screen and reduced to a size smaller than or equal to the size of the screen, and
   acquiring location information of the partial content of the current page to analyze the current page content based on the location information, the location information indicating that the partial content is located at a specific location within the current page;
   determining at least one local search suggestion matching the page content information based on the analysis;
   presenting the at least one local search suggestion as a popup message box at a layer above the current page in the user equipment;
   revising the local search suggestion selected by the user and thereby acquiring at least one network search suggestion matching the local search suggestion; and
   initiating a search based on the matching search suggestion reselected by the user to acquire a search result.

2. The method according to claim 1, wherein the acquiring, based on a current page presented in user equipment, page content information corresponding to page content currently browsed by a user comprises:
   analyzing the current page directly, when it is determined that the page content currently browsed by the user is complete content of the current page, and acquiring the page content information corresponding to the page content currently browsed by the user.

3. The method according to claim 1, further comprising:
   acquiring a local search suggestion selected by the user from the at least one local search suggestion; and
   searching based on the selected local search suggestion, to acquire the search result.

4. The method according to claim 3, wherein the step of searching based on the selected local search suggestion, to acquire the search result further comprises:
   acquiring at least one network search suggestion from service equipment based on the selected local search suggestion, and presenting the at least one network search suggestion to the user;
   acquiring a network search suggestion selected by the user from the at least one network search suggestion; and
   searching based on the selected network search suggestion, to acquire the search result.

5. The method according to claim 1, when the current page is presented in the user equipment, prompt information for prompting the predetermined movement track is presented.

6. An apparatus for providing a local search suggestion, comprising:
   a first acquisition module configured to acquire, based on a current page presented in user equipment, page content information corresponding to page content currently browsed by a user, in response to detecting the user equipment moving along a moving track matching a predetermined movement track;
   a determination module configured to determine at least one local search suggestion matching the page content information; and
   a presentation module configured to present the at least one local search suggestion on the current page in the user equipment;
   a second acquisition sub-module configured to acquire a partial area of the current page, when it is determined based on a scaling of the current page that the current page is in a zoom-in state with reference to a determined size of the current page and that the determined size of the zoomed-in current page is greater than a size of a screen of the user equipment, the user equipment determining that the page content currently browsed on the user equipment is partial content of the current page, the page content information being located within the partial area, and the size of the current page being capable of being enlarged to a size larger than the size of the screen and reduced to a size smaller than or equal to the size of the screen;
   a location information acquisition sub-module configured to acquire location information of the partial content of the current page to analyze the current page content based on the location information, the location information indicating that the partial content is located at a specific location within the current page, at least one locate search suggestion matching the page content information being determined based on the analysis;

a presentation module configured to present the at least one local search suggestion as a popup message box at a layer above the current page in the user equipment;

wherein the local search suggestion selected by the user is revised and thereby acquire at least one network search suggestion matching the location search suggestion, a search being initiated based on the matching search suggestion reselected by the user to acquire a search result.

7. The apparatus according to claim 6, wherein the first acquisition module further comprises:

a fourth acquisition sub-module configured to analyze the current page directly, when it is determined that the page content currently browsed by the user is whole content of the current page, and acquire the page content information corresponding to the page content currently browsed by the user.

8. The apparatus according to claim 6, further comprising:

a second acquisition module configured to acquire a local search suggestion selected by the user from the at least one local search suggestion; and a search module configured to search based on the selected local search suggestion, to acquire the search result.

9. The apparatus according to claim 8, wherein the search module further comprises:

a third acquisition module configured to acquire at least one network search suggestion from service equipment based on the selected local search suggestion, and present the at least one network search suggestion to the user;

a fourth acquisition module configured to acquire a network search suggestion selected by the user from the at least one network search suggestion; and a search sub-module configured to search based on the selected network search suggestion, to acquire the search result.

10. A non-transitory computer storage medium storing a computer program, which when executed by one or more processors, cause the one or more processors to perform operations, the operations comprising:

acquiring, based on a current page presented in user equipment, page content information corresponding to page content currently browsed by a user, in response to detecting the user equipment moving along a moving track matching a predetermined movement track, the acquiring, based on a current page presented in a user equipment, page content information corresponding to page content currently browsed by a user comprising:

acquiring a partial area of the current page when it is determined that based on a scaling of the current page that the current page is in a zoomed-in state with reference to a determined size of the current page and that the determined size of the zoomed-in current page is greater than a size of a screen of the user equipment, the user equipment determining that the page content currently browsed on the user equipment is partial content of the current page, the page content information being located within the partial area, and the size of the current page being capable of being enlarged to a size larger than the size of the screen and reduced to a size smaller than or equal to the size of the screen, and acquiring location information of the partial content of the current page to analyze the current page content based on the location information, the location information indicating that the partial content is located at a specific location within the current page;

determining at least one local search suggestion matching the page content information based on the analysis; and presenting the at least one local search suggestion as a popup message box at a layer above the current page in the user equipment;

revising the local search suggestion selected by the user and thereby acquiring at least one network search suggestion matching the local search suggestion; and initiating a search based on the matching search suggestion reselected by the user to acquire a search result.

11. A computer device, comprising a memory and a processor, wherein the memory stores computer code, and the processor is configured to execute the computer code to implement a method for providing a local search suggestion, the method comprising:

acquiring, based on a current page presented in user equipment, page content information corresponding to page content currently browsed by a user, in response to detecting the user equipment moving along a moving track matching a predetermined movement track, the acquiring, based on a current page presented in a user equipment, page content information corresponding to page content currently browsed by a user comprising:

acquiring a partial area of the current page when it is determined that based on a scaling of the current page that the current page is in a zoomed-in state with reference to a determined size of the current page and that the determined size of the zoomed-in current page is greater than a size of a screen of the user equipment, the user equipment determining that the page content currently browsed on the user equipment is partial content of the current page, the page content information being located within the partial area, and the size of the current page being capable of being enlarged to a size larger than the size of the screen and reduced to a size smaller than or equal to the size of the screen, and acquiring location information of the partial content of the current page to analyze the current page content based on the location information, the location information indicating that the partial content is located at a specific location within the current page;

determining at least one local search suggestion matching the page content information based on the analysis;

presenting the at least one local search suggestion as a popup message box at a layer above the current page in the user equipment;

revising the local search suggestion selected by the user and thereby acquiring at least one network search suggestion matching the local search suggestion; and initiating a search based on the matching search suggestion reselected by the user to acquire a search result.

* * * * *